T. A. KILLMAN.
HYDRAULIC TRANSMISSION SYSTEM.
APPLICATION FILED JULY 29, 1913.
1,145,317.
Patented July 6, 1915.
3 SHEETS—SHEET 1.
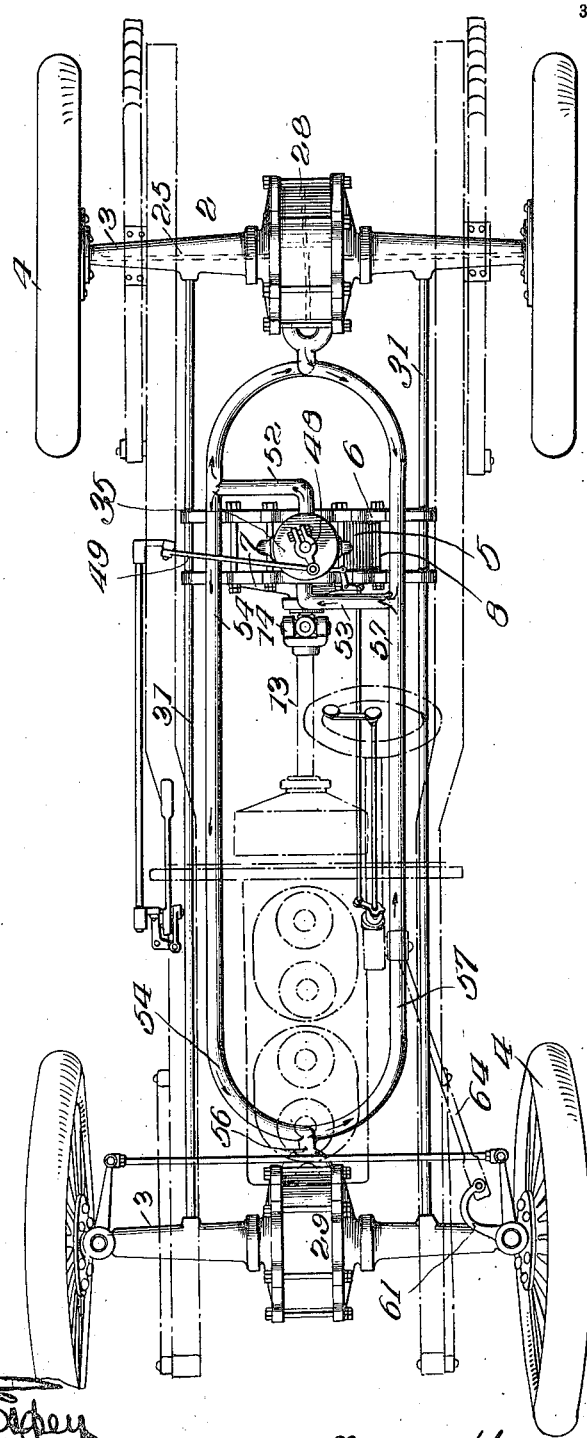
Inventor
T. A. Killman

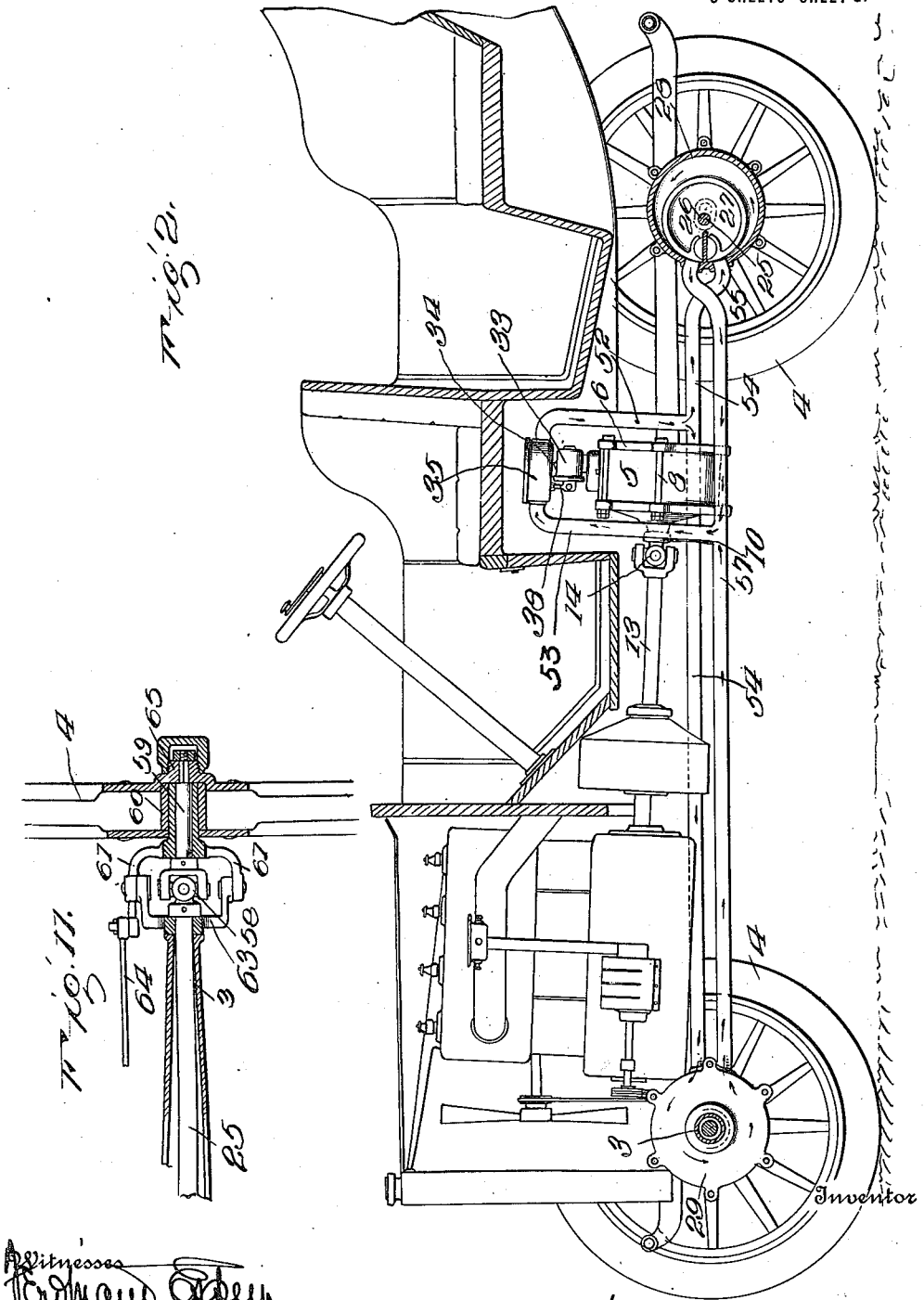

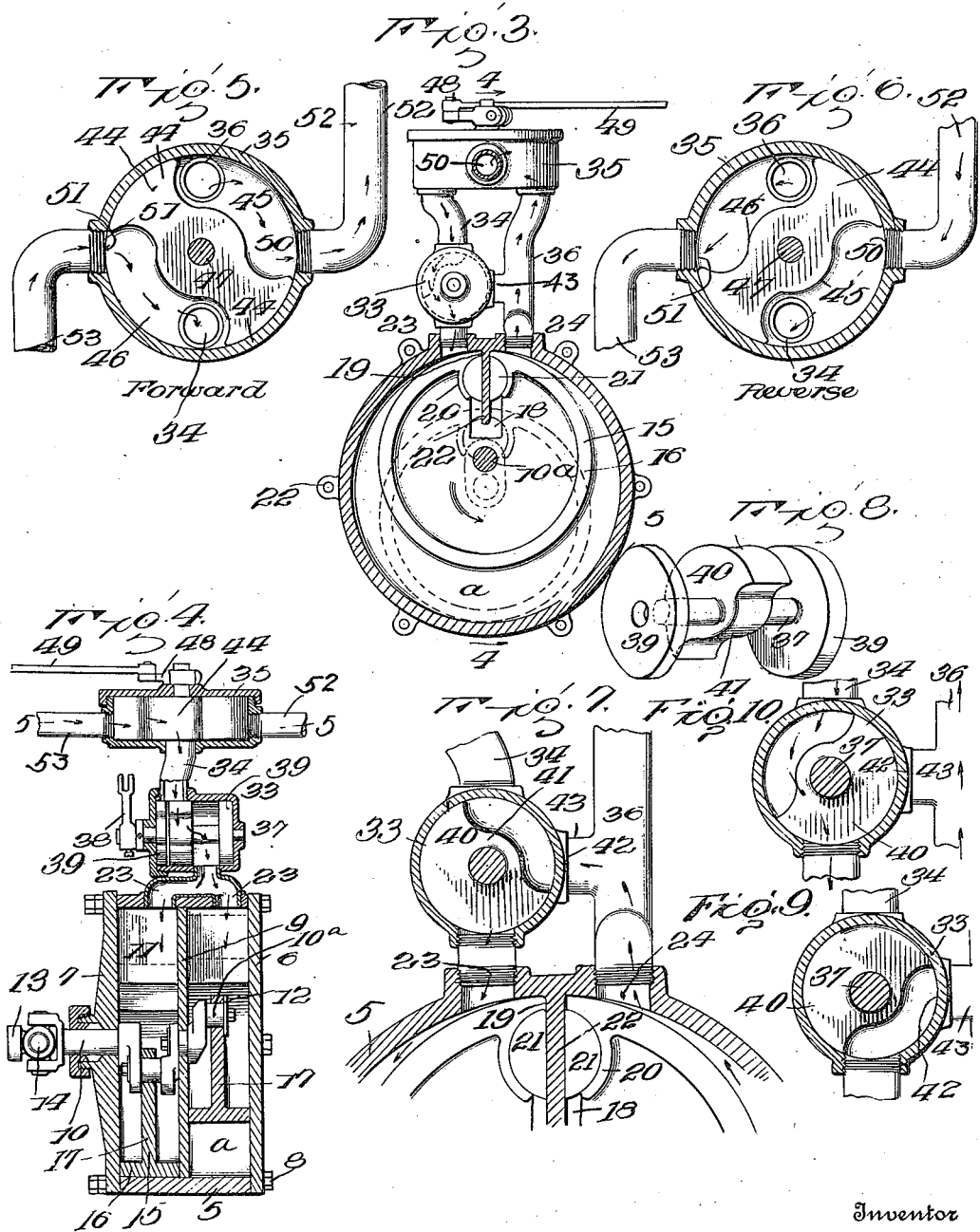

UNITED STATES PATENT OFFICE.

THOMAS A. KILLMAN, OF NASHVILLE, TENNESSEE, ASSIGNOR OF ONE-TENTH TO WILLIAM L. DANLEY, OF NASHVILLE, TENNESSEE, AND ONE-TENTH TO EDWARD H. ROY, OF TULLAHOMA, TENNESSEE.

HYDRAULIC TRANSMISSION SYSTEM.

1,145,317.  Specification of Letters Patent.  Patented July 6, 1915.

Application filed July 29, 1913. Serial No. 781,857.

*To all whom it may concern:*

Be it known that I, THOMAS A. KILLMAN, citizen of the United States, residing at Nashville, in the county of Davidson and State of Tennessee, have invented certain new and useful Improvements in Hydraulic Transmission Systems, of which the following is a specification.

My invention relates to power transmission mechanism and particularly to fluid operated transmission mechanism.

The primary object of my invention is to provide a relatively simple, easily operated and controlled hydraulic transmission mechanism particularly adapted for automobiles and which will eliminate the necessity of using the present mechanical transmission gearing with its accompanying noise, jar and general inconvenience.

A further object of this invention is to provide a hydraulic transmission mechanism which may be readily controlled so that the direction of movement of the driven element may be readily changed.

A further object is to provide a hydraulic transmission mechanism in which the speed of the driven element may be readily controlled and in which the driven element may be entirely cut off from operative connection with the driving element and run free.

A further object is to provide a hydraulic transmission mechanism which will act as a brake when desired so as to eliminate the necessity of using an auxiliary or additional braking means.

A further object is to provide a hydraulic transmission mechanism wherein the parts may be started, stopped, reversed and the speed thereof controlled by the manipulation of only two valves.

A further object is to provide a hydraulic transmission mechanism in which the driven element may be stopped, started or the speed thereof controlled by the operation of only one valve.

Still another object is the provision of a driving element or current generator and one or more driven elements operated by the current so generated, all having the same general character, thus conducing to simplicity of construction and operation.

Other objects will appear in the course of the following description.

My invention is illustrated in the accompanying drawings, wherein:

Figure 1 is a top plan view of the frame of an automobile the chassis being removed but the engine and like parts being illustrated in dotted lines. Fig. 2 is a longitudinal section through an automobile containing my improved hydraulic transmission apparatus. Fig. 3 is a vertical section of the current generator or pump, the valve casings inclosing the valves whereby the current is controlled being shown in elevation. Fig. 4 is a vertical section on the line 4—4 of Fig. 3. Fig. 5 is a transverse section on the line 5—5 of Fig. 4. Fig. 6 is a like view to Fig. 5 but showing the valve turned so as to reverse the direction of the flow of the current. Fig. 7 is an enlarged fragmentary section of the upper portion of the current generator or pump, the controlling valve casing being shown in section. Fig. 8 is a perspective view of the controlling valve. Fig. 9 is a face view of the controlling valve and casing therefor but showing the valve in its braking position. Fig. 10 is a like view to Fig. 9 but showing the valve in its speed controlling position. Fig. 11 is a fragmentary section through one of the steering wheels of the automobile and through the axle housing of same.

In the drawings 2 designates the housing of the rear axle and 3 the housing of the front axle. All of the wheels of the automobile are drive wheels, these wheels being designated 4.

My improved transmission apparatus includes a pump or current generator and incased rotors, one for each of the axles driven by a current impelled from said generator. The current generator is illustrated particularly in Figs. 3 and 4 and comprises a cylindrical casing 5, this casing being closed at its ends by means of the heads 6 and 7, these heads being held in engagement with the peripheral walls of the casing by means of bolts 8. Preferably the casing 5 is divided into two sections by means of an intermediate wall 9. Extending into the head 7 is one end of a crank shaft 10 which is supported in suitable bearings in the head 7 and in the intermediate division plate 9, this crank shaft having two cranks disposed one in each of the pumping chambers 11 and 12. The end of the crank shaft is connected to a driving shaft 13 extending from the motor of the car by means of a universal joint of any suitable character and designated generally 14.

Disposed in each of the chambers 11 and 12 is a cylindrical piston 15. Each piston is formed with a peripheral wall 16 and a middle web 17. This web 17 is radially slotted as at 18. The wrist pin of the crank corresponding to the piston and designated 10$^a$ passes through the center of the circular piston. The circumferential wall 16 is split at 19 and the wall is extended inward as at 20 so as to form an open bead or bearing for engagement with the semicircular packing members 21. The wall of the pump casing 5 has an inwardly projecting wing or plate 22 which extends through the slit 19 and between the packing members 21 into the slot 18. The casing 5 is formed with the ports 23 and 24, the port 23 being located on one side of the wing 22 while the port 24 is located on the other side. One of these ports always constitutes an inlet and the other an outlet or discharge port.

Now, as the crank 10$^a$ is revolved, the piston 15 will be carried in a circular path so that its periphery will have a sliding and slightly rocking engagement with the inner face of the wall of the casing 5, the bearing 20 and the packing members 21 permitting the piston to rock upon the packing members. In Fig. 3 the piston is shown at the beginning of its stroke. The space $a$ below the piston we will assume is filled with water or oil or other fluid. Now as the crank 10$^a$ revolves in the direction of the arrow the piston will be carried laterally toward the left hand side of the casing illustrated in Fig. 3, then downward and laterally toward the right hand side of the casing, and then upward, and all of the fluid which is disposed in the space $a$ will be forced out through the port 24. While the piston is moving downward and toward the left it will open the space above the piston and as the piston moves in the direction described, fluid will be drawn in through the port 23. It will be noted that the piston on one side of the wall 9 is set opposite to the piston on the other side of the wall 9 and that as a consequence one of the pistons is always drawing in fluid while the other piston is always forcing the fluid out. It will also be evident that if the crank shaft 10 be turned in a direction opposite to that indicated by the arrow in Fig. 3, in a clockwise direction, the port 24 will become the inlet port while the port 23 will become the outlet or discharge port.

The rear wheels 4 are each connected to a shaft 25, the shaft 25 on one side being independent of the shaft 25 on the other side and each of these shafts carries an independent crank at its inner end, the wrist pin 26 of which is connected to a circular piston 27 of precisely the same character as the piston 15 heretofore described, these independent pistons being contained within a casing 28 having exactly the same character as the casing 5 and divided into two chambers by an intermediate septum. While the construction shown in Figs. 3 and 4 is designed to act as a pump it will be obvious that if fluid is forced into the inlet opening of the casing 5, that it will cause the piston to travel in a circular path such as that described and the fluid will pass out through the opposite port. Thus when the radial piston is positively driven by means of a crank shaft it will act as a pump, whereas if it be driven by means of fluid pressure it will act as a motor and transmit the circular motion of the piston to the crank shaft. The mechanism contained within the casing 5, therefore, acts as a pump entirely while the like mechanism contained within the casing 28 acts as a motor or transmission device whereby the power of the current generated by the pump is caused to transmit motion to the drive wheels of the apparatus.

While I do not wish to be limited to the provision of a motor or transmission device upon the forward axle, I preferably use such a construction. As previously described for the rear axle, the forward wheels are mounted upon independent axles, each axle having a crank at its inner end, each crank being connected to a circular piston 27 operating within a circular casing 29 precisely like the casing 28 and divided into two parts by an intermediate septum. The reason for providing an axle for each wheel connected by means of a crank to separate and independent operating pistons is to provide for the differential movement of the two wheels of a pair upon rounding a curve, so that one wheel may rotate relatively slowly while the other is rotating relatively fast.

As illustrated in Fig. 1, the front and rear axles or axle sections are inclosed within the housings 3 which at their inner ends are connected to the respective casings 28 and 29. The manner in which the separate wheels are connected to their axle sections will be later stated. The housings of the front and rear axles are connected to each other by means of longitudinal bars or braces 31 so as to hold these housings in rigid parallel relation. While I do not wish to be limited to this, yet it is preferable to form the frame of the machine of tubing or a like structural element whereby the fluid medium may be pumped from the pump or current generator to the receivers or motors. The system of piping or tubing whereby this is accomplished and the system of valves whereby the movement of the fluid may be controlled will be now described.

As will be seen in Figs. 3 and 4, each of the chambers 11 and 12 is provided with an inlet port and an outlet port. Both of the inlet ports for the chambers 11 and 12 merge into a common short pipe section which opens into the valve casing 33 and from this valve casing extends a pipe 34 which opens into a valve casing 35. From this valve casing 35 also extends a pipe 36 which opens at its lower end into both of the ports 24.

Disposed within the valve casing 33 is the valve shown in Fig. 8. This valve comprises a transverse shaft 37 which is supported in bearings in the valve casing 33. One end of this support or shaft 37 extends out through the valve casing and carries at its end a crank arm 38 whereby the valve may be rotated. Opposite ends of the support are provided with the circular disks 39 which fit snugly within the interior of the casing 33 and act to support the shaft and close the ends of the casing preventing any escape of motive fluid. Mounted upon the shaft 37 in spaced relation to the disks 39 is a valve disk member designated 40. This valve disk has approximately the form of a segment of a circle, one segment of the complete circle being cut away to leave a face 41 which extends diametrically with relation to the valve support. The form of this cut away portion of the valve 40 with relation to the casing is illustrated particularly clearly in Fig. 7. The valve casing 33, as before stated, is connected to the ports 23 and also has a port 42 having quartering relation to the first named ports which connects by means of a bypass 43 to the pipe 36. The pipe 34 enters the valve casing 33 immediately above the passage communicating with the port 23 and in approximately quartering relation to the bypass pipe 43. The valve 40 is for the purpose of controlling the speed of the machine and for the purpose of either stopping the machine or starting it, as will hereafter more fully appear. Said valve has a thickness less than the depth of the valve casing but its arcuate or working face has an area sufficient to cover any of the ports when turned over the same.

Disposed within the valve casing 35 is the valve 44 as illustrated in Figs. 5 and 6. This valve 44 extends transversely across the valve casing, and is cut away on each side as at 45 and 46 so as to form a four-way valve. The valve casing 35 is disposed horizontally with relation to the pipes 34 and 36 and these pipes open into the bottom of the valve casing. The valve 44 is mounted upon a spindle 47 which extends out through the top of the valve casing and is there connected to a crank 48, in turn connected to an actuating rod 49 whereby the valve may be manipulated. The circumference of the valve casing 35 is formed at diametrically opposite points with ports 50 and 51 which are disposed in quartering relation to the openings of the pipes 34 and 36 and connected to these ports 50 and 51 are the pipes 52 and 53. The pipe 52 when the machine is running forward is the discharge pipe while the pipe 53 when the machine is running forward is the receiving pipe. The pipe 52 extends laterally and downward and is then connected to the pipe 54, one branch of which extends forward while the other extends rearward. This pipe 54 at its rearward end is branched as at 55 so as to open into each of the chambers containing the pistons 27. The forwardly extending branch of the pipe 54 is also branched as at 56 so as to discharge into both of the chambers of the forward motor casing 29. The pipe 53 likewise leads laterally and downward and opens into a pipe 57 which extends longitudinally of the machine, one branch of this pipe extending rearward and being branched at its extremity and opening into the outlet ports of the piston chambers in the casing 28. The pipe 57 also extends forward and is branched at its forward end and opens into the piston chambers in the casing 29.

I have thus provided by the mechanisms above described, for the complete circulation of the motive fluid from the pump through the forward and rear motors and back to the pump and as long as the current of the fluid medium flows in one direction the pistons of the motors will be propelled in a direction which will cause the machine to move forward. If, however, the direction of movement of the current be reversed it is obvious that the reversal of the direction of movement of the wheels will occur and the machine will back.

Assuming now that the engine is operating but that the machine is standing still, the path of the current and the position of the valves will be as follows: The valve 44 will be in the position shown in Fig. 5, which is the position taken by this valve when it is desired to impel the machine forward. The valve 40, however, will be in the position shown in Fig. 9 and the port 42 will be operatively connected with the ports 23, the pipe 34 being blocked. In the operation of the pump, fluid will be drawn into the ports 23 and also ejected through the ports 24, passing into the end of the pipe 36. As the bypass 43 is open, and inasmuch as the easiest path of movement for the fluid will be through the bypass 43, the fluid will travel into the lower end of the pipe 36, thence through the bypass 43 into the valve casing 33 below the face 41 of the valve 40, then laterally into the space between the valve and a disk 39 and thence back through the port 23 into the casing 5 again. There will thus be what may be termed a short circuiting of the motive fluid without the motive fluid doing any work upon the motors. The engine therefore may be running, the pump may be operating, but the motors connected to the wheels will be stationary.

If now it is desired to start the machine, the valve 40 is turned to the position shown in Fig. 10, connecting the pipe 34 directly with the port 23 and closing the bypass 43. Under these circumstances motive fluid will immediately be drawn from the pipe 34 and from the piping system connected thereto, into the pumping chamber or casing 5 and forcibly ejected through the ports 24 into the pipe 36 and thence carried upward into the valve chamber 35, directed by valve 44 into the pipe 52 and then carried through the pipe 54 to the motors contained in the casings 28 and 29. The fluid pressure in the pipe 54 will cause these motors to rotate. The fluid after it has done its work upon the motors will pass out into the pipe 57, will be returned by this pipe 57 to the pipe 53, will thence pass into the casing 35 once more and will be conducted into the pipe 34 as illustrated in Fig. 5. From the pipe 34 the motive fluid will again pass into the fluid chamber 33 and will be conducted directly to the ports 23 of the pumping chambers.

It is, of course, desirable to start up with a relatively slow speed and this end is readily secured by properly adjusting the valve 40, so that the outlet from the pipe 34 into the pumping chamber or chambers may be relatively small. By turning the valve to gradually increase the area of the passage leading from pipe 34 to the pumping chamber the speed will be gradually increased until when the valve is turned to its full position as shown in Fig. 10, full speed ahead will be secured.

If now it is desired to stop the forward movement of the vehicle the valve 40 may be shifted to gradually reduce the area of the passage leading from the pipe 34 to the inlet ports 23 of the pumping chamber and thus the supply of motive fluid will be reduced, the motive fluid will have greater difficulty in passing through the system of pipes and as a consequence the speed of rotation of the motors will be correspondingly reduced.

If it is desired that a braking action shall be secured, the valve 40 is turned to the position shown in Fig. 7. In this position the valve 40 entirely closes the discharge end of the pipe 34 and thus the pump acts to compress the fluid within the pipe 36 and the pipes connected thereto, and in the induction sides of the motors but inasmuch as there is no discharge from these motors, the pressure on both sides of the pistons of the motors will prevent the further operation thereof. Of course, there will be a slight leakage of fluid past the pistons in the motors but this will have merely a cushioning effect and will not prevent the motors acting under these circumstances as brakes.

The reversal of the engine is secured in the following manner: When the valve 44 is turned to the position shown in Fig. 5, the flow of fluid through the pipes of the system is such that the motors are driven forward. When, however, the valve is shifted to the position shown in Fig. 6, it will be seen that the pipe 36 is operatively connected with the pipe 53 while the pipe 34 is operatively connected to the pipe 52. This causes the flow to move reversely through the system of pipes and through the motors, thus reversing the motors and causing a reversal of the direction of running.

It will be noted that there are only two valves for controlling this mechanism, one valve 44 being only used for reversing and that the other valve 40 is not only used for varying the speed of drive but is also used as a brake. Inasmuch as a reversing of the movement of the motors is only needed at comparatively infrequent intervals it will be seen that practically one valve controls the operation of the mechanism and that this valve is so simple that no confusion can exist with regard to its operation. This is a great advance over the use of change speed gears, reverse gears, etc., as used in the ordinary automobile practice of today. It is in the manipulation of the change speed gears that the greatest difficulty exists in running an automobile. My control mechanism is so simple that it is readily learned and when learned it causes the machine to be so completely under the control of the operator that few accidents can occur.

While I may use any form of mounting for the steering wheels of this machine I preferably use the form of mounting illustrated in Fig. 11. In this figure it will be seen that the axle 25 is connected to the steering wheels by a universal joint so as to permit the steering wheels to be turned and at the same time to be positively driven. To this end the axle 25 is formed at each end with a knuckle 58 to which a corresponding knuckle of an axle spindle 59 is pivoted. Surrounding the spindle is a sleeve 60 upon which the steering wheel rotates. This sleeve 60 has steering arms 61 connected thereto, one of said arms being shorter than the other and both of said arms being pivoted to the arms of a bracket 63 extending out in opposite directions from the housing 3 of the axle. One of said arms 61 is extended beyond its pivotal point and is there connected to a steering rod 64. The spindle 59 extends entirely through the sleeve 60 and is connected at its end to a head 65 which is connected directly to the wheel. It will be seen under these circumstances that rotation will be communicated from the axle to the knuckle 58 and thence to the spindle 59 and that the spindle may be turned at any angle to the axle and yet power will be transmitted. The shifting of the wheel for the purpose of steering it will be accomplished, of course, by actuating the rod 64. It is obvious that it is necessary that the pivotal points for the arms 61 must be in alinement with the trunnions of the universal joint 58 upon which the spindle 59 or shaft section turns.

While I do not wish to be limited to any particular fluid or liquid for use as the fluid medium of the transmission, oil will preferably be used.

While I have illustrated what I believe to be the best form of my invention, I do not wish to be limited thereto as it is obvious that many minor changes might be made without departing from the spirit thereof.

I make no claim herein to the pump or motor *per se*, the novel features of the same being claimed in my application filed September 24th, 1913, Serial No. 791,560.

What I claim is:

In a machine of the character described, the combination with a cylindrical pump casing and a rotary piston therein, said pump casing having an abutment and ports disposed on each side of the abutment, of a controlling valve casing having a port communicating with one of said ports of the pump casing, an oppositely disposed port and a port in quartering relation to the first named ports, a segmental valve in said casing adapted to connect the last named port with either one of the first named ports or to directly connect both of said first named ports and close the last named port, a reversing valve casing having a port communicating with one of the first named ports of the controlling valve casing, a pipe connecting said reversing valve casing to one of the ports of the pump and having a by-pass communicating with the second named port of the controlling valve casing, a hydraulic motor having inlet and outlet ports, and pipes connecting each of said ports with the reversing valve casing at diametrically opposite points thereof.

In testimony whereof I affix my signature in presence of two witnesses.

THOMAS A. KILLMAN. [L. S.]

Witnesses:
 EDWARD H. ROY,
 JOSEPH C. ZIRKLE.